M. L. CALLENDER.
Lamp.

No. 48,128.

Patented June 6, 1865.

Witnesses:
Hur Geo Harvel
Chas. H. Smith

Inventor:
Mills L. Callender.

UNITED STATES PATENT OFFICE.

MILLS L. CALLENDER, OF NEW YORK, N. Y., ASSIGNOR TO THE CALLENDER LAMP MANUFACTURING COMPANY, OF SAME PLACE.

IMPROVEMENT IN LAMPS.

Specification forming part of Letters Patent No. 48,128, dated June 6, 1865.

*To all whom it may concern:*

Be it known that I, MILLS L. CALLENDER, of the city and State of New York, have invented, made, and applied to use a certain new and useful Improvement in Lamps; and I do hereby declare the following to be a full, clear, and exact description of the same, reference being had to the annexed drawings, making part of this specification, wherein—

Figure 1:
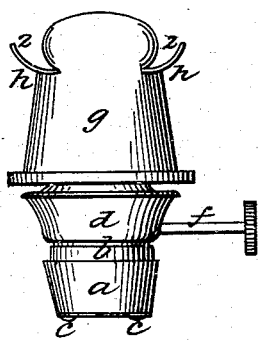
Figure 2:
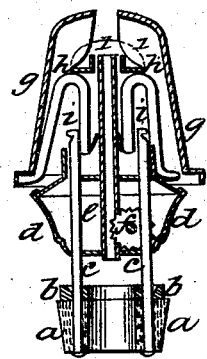
Figure 3:
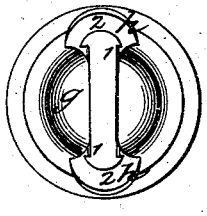
Figure 4:
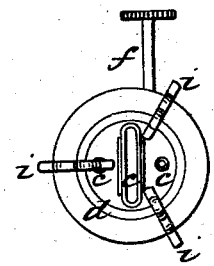

Figure 1 is an elevation of my burner for lamps. Fig. 2 is a vertical section of the same. Fig. 3 is a plan of the cone or deflector, and Fig. 4 is a plan with the cone or deflector removed.

Similar marks of reference denote the same parts in all the figures.

Lamps have heretofore been made with a thimble uniting the burner to the lamp in such a manner that the burner could be raised for filling the lamp without being unscrewed, and a support for the cone or deflector has been provided that is lengthened in a horizontal direction to prevent heat being conducted to the wick-tube, as shown in my patent of February 18, 1862; and lips have been made, one each side of the wick-tube, upon which the base of the flame rests.

The nature of my said invention consists in a stopper of india-rubber, attached to the burner in such a manner that the ordinary screw is dispensed with and access allowed for filling. I also provide rods sliding with or on which the whole burner slides, so that the reservoir may be filled by lifting the burner. I also make use of a connection from the burner to the cone or deflector, consisting of a folded wire or strip, which increases the length of such metallic connection to prevent the conduction of heat without changing the size or shape of the burner; and I employ a metallic plate, forming an inner deflector and extending beyond the ends of the slot in the deflector, to form a flame-spreader.

My burner may be used with or without a chimney.

In the drawings, $a$ is a ring or cylinder of rubber, forming a stopper, with a metallic top piece, $b$; and $c\ c$ are wires connecting $a$ and $b$ and passing up into and through the body or shell $d$ of the burner, and a hole is made through the center of $a$. This stopper $a$ is to be entered into the top of the lamp-reservoir, and its elasticity makes it fit tightly in place. The burner can be raised for filling the reservoir through the center hole of $a\ b$ and again lowered to place. If the two wires $c\ c$ are used, this attachment will be very firm; but one wire might be employed, so that the lamp-burner could be turned aside after it had been raised; and the wires $c$ might be attached to the burner and slide into the reservoir instead of rising above.

$e$ is the wick-tube, and $f$ the wick-raiser, of any usual character.

$g$ is the cone or deflector, having a slot at its upper end for passing the flame. This cone is sustained by the supports $i\ i\ i$, which are folded so as to pass up and then down, to increase the length, so that heat imparted to the cone by the flame must be conducted before reaching the burner or wick-tube. These connections $i\ i$ may be of any desired number and formed of wire or strips of metal, and the ends are to be attached to the burner and cone or deflector, respectively, in any convenient manner.

$h$ is a metal plate passing across the deflector at the bottom of the opening in the same, upon which plate lips 1 1 are formed at the sides of the opening for the wick-tube, and from these lips the flame ascends, a current of air passing between those lips and the wick $e$ into the flame, and also above the plate $h$ against the sides of the flame as it passes through the opening in $g$. The ends of this plate $h$ are extended at 2 2 outside the deflector $g$, the object being to cause the flame to spread under and flatten by said parts 2 2, arresting the current of air that ascends around the outside of the burner and would have a tendency to prevent the flame spreading. These plates 2 2 cause a much more perfect light, because the air passing through the cone is at liberty freely to spread said flame into a thin sheet.

It will be evident that the rods $c\ c$ between the burner and reservoir allow the burner to be raised or pressed down and always keep the parts connected to each other and in their required position.

What I claim, and desire to secure by Letters Patent, is—

1. Sustaining the cone or deflector by supports that are bent or folded to increase their length, for the purposes and substantially as specified.

2. The plate $h$, extending across the deflector $g$, and having an opening with lips 1 1, composing an inner deflector, and formed with the flame-spreading projections 2 2, as and for the purposes specified.

In witness whereof I have hereunto set my signature this 24th day of March, A. D. 1864.

MILLS L. CALLENDER.

Witnesses:
   THOS. GEO. HAROLD,
   CHAS. H. SMITH.